US011652606B2

(12) United States Patent
Sharma et al.

(10) Patent No.: US 11,652,606 B2
(45) Date of Patent: May 16, 2023

(54) ADVANCED ENCRYPTION STANDARD SEMICONDUCTOR DEVICES FABRICATED ON A STACKED-SUBSTRATE

(71) Applicant: INTEL CORPORATION, Santa Clara, CA (US)

(72) Inventors: Abhishek A. Sharma, Hillsboro, OR (US); Willy Rachmady, Beaverton, OR (US); Ravi Pillarisetty, Portland, OR (US); Gilbert Dewey, Beaverton, OR (US); Jack T. Kavalieros, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1087 days.

(21) Appl. No.: 16/140,918

(22) Filed: Sep. 25, 2018

(65) Prior Publication Data

US 2020/0099509 A1    Mar. 26, 2020

(51) Int. Cl.
*H04L 9/06* (2006.01)
*H04L 9/08* (2006.01)
*G06F 9/30* (2018.01)
*G06F 12/0875* (2016.01)
*G06F 3/06* (2006.01)
*G06F 12/0862* (2016.01)

(52) U.S. Cl.
CPC .......... *H04L 9/0631* (2013.01); *G06F 3/0623* (2013.01); *G06F 9/30007* (2013.01); *G06F 12/0862* (2013.01); *G06F 12/0875* (2013.01); *H04L 9/0816* (2013.01)

(58) Field of Classification Search
CPC ... H04L 9/0631; H04L 9/0816; G06F 3/0623; G06F 9/30007; G06F 12/0862; G06F 12/0875
See application file for complete search history.

(56) References Cited

U.S. PATENT DOCUMENTS 6,447,838 B1 * 9/2002 Azuma ................... H01L 28/55
                                                        29/25.35
2008/0157314 A1 * 7/2008 Clevenger ............. H01L 23/576
                                                        257/679

OTHER PUBLICATIONS

Kirk Saban, "Xilinx Stacked Silicon Interconnect Technology Delivers Breakthrough FPGA Capacity, Bandwidth, and Power Efficiency", Dec. 11, 2012, White Paper Virtex-7 FPGAs, Xilinx, WP380 (v1.2), 10 pages.

(Continued)

*Primary Examiner* — Hee K Song
(74) *Attorney, Agent, or Firm* — Schwabe, Williamson & Wyatt, P.C.

(57) ABSTRACT

A stacked-substrate advanced encryption standard (AES) integrated circuit device is described in which at least some circuits associated logic functions (e.g., AES encryption operations, memory cell access and control) are provided on a first substrate. Memory arrays used with the AES integrated circuit device (sometimes referred to as "embedded memory") are provided on a second substrate stacked on the first substrate, thus forming a AES integrated circuit device on a stacked-substrate assembly. Vias are fabricated to pass through the second substrate, into a dielectric layer between the first substrate and the second substrate, and electrically connect to conductive interconnections of the AES logic circuits.

14 Claims, 9 Drawing Sheets

(56) References Cited

OTHER PUBLICATIONS

Tobias Höchbauer, "On the Mechanisms of Hydrogen Implantation Induced Silicon Surface Layer Cleavage", Nov. 2001, presented by Department of Chemistry the Philipps University Marburg, 209 pages.

* cited by examiner

ADVANCED ENCRYPTION STANDARD SEMICONDUCTOR DEVICES FABRICATED ON A STACKED-SUBSTRATE

BACKGROUND

Advanced encryption standard (AES) is a symmetric key encryption algorithm for securely encrypting and decrypting data. At a high level, AES encrypts data by first deriving a round key from a cipher key. Each byte of data to be encoded is repeatedly combined with a block of the round key. Values in each byte of data are then replaced with another value according to a non-linear substitution from a lookup table. A linear mixing operation is then performed on the columns in which the bytes of data are organized for the purposes of encryption. The bytes of data may then be combined with a block of the round key in another iteration of the first "round key" operation. These processes can be repeated a number of times to increase the level of encryption sophistication, thereby increasing the difficulty of unauthorized decryption.

Figure 1A:
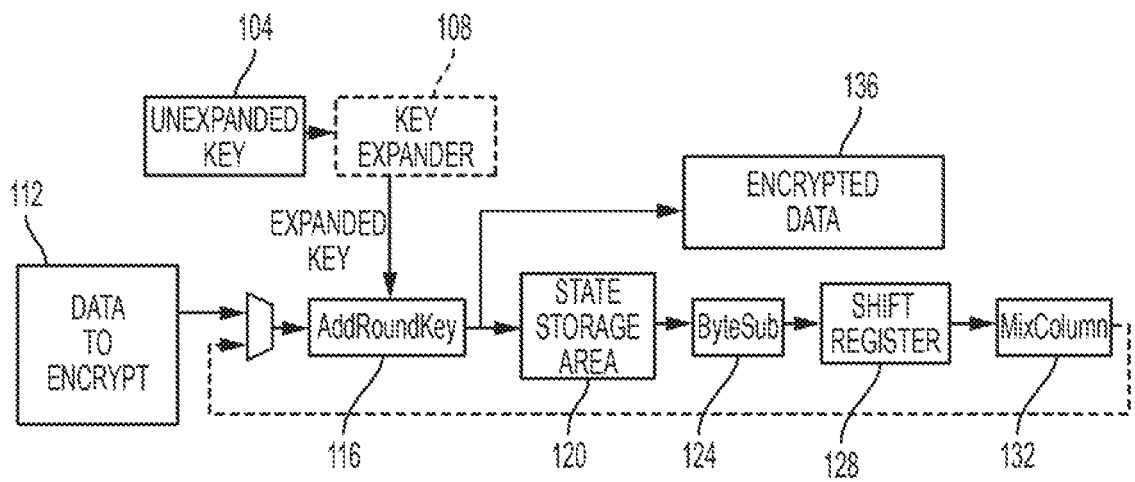
FIG. 1A is method flow diagram for an advance encryption (AES) standard algorithm.

The figures depict various embodiments of the present disclosure for purposes of illustration only. Numerous variations, configurations, and other embodiments will be apparent from the following detailed discussion. Furthermore, as will be appreciated, the figures are not necessarily drawn to scale or intended to limit the described embodiments to the specific configurations shown. For instance, while some figures generally indicate straight lines, right angles, and smooth surfaces, an actual implementation of the disclosed techniques may have less than perfect straight lines and right angles, and some features may have surface topography or otherwise be non-smooth, given real-world limitations of fabrication processes. In short, the figures are provided merely to show example structures.

It is noted that designations such "above" or "below" or "top" or "bottom" or "top side" or "bottom side" are not intended to necessarily implicate a limitation as to orientation of the embodiments described herein. Rather, such terminology is simply used in a relative sense to consistently describe a structure as it exists in any one particular orientation and as illustrated herein. In addition, the designation such "over" is not intended to necessarily implicate a limitation as to one structure being distinct from another underlying structure. For example, if an integrated circuit integrated circuit is over a first semiconductor substrate and below a second semiconductor substrate, the integrated circuit may be formed on a topside of the first substrate by depositing additional materials onto the topside of the first substrate, or by shaping (by way of lithography and etching) a portion of the first substrate into one or more parts of the integrated circuit, or by a combination such depositing and shaping. In still other embodiments, the integrated circuit may be formed on a backside of the second substrate by depositing additional materials onto the backside of the second substrate, or by shaping (by way of lithography and etching) a portion of the second substrate into one or more parts of the integrated circuit, or by a combination such depositing and shaping.

DETAILED DESCRIPTION

Techniques are disclosed for fabricating a stacked-substrate advanced encryption standard (AES) integrated circuit device in which at least some circuits associated with logic functions (e.g., AES encryption operations, memory cell access and control) are provided on a first substrate. Memory arrays used with the AES integrated circuit device (sometimes referred to as "embedded memory") are provided on a second substrate stacked over the first substrate, thus forming an AES integrated circuit device having a stacked-substrate assembly. The second substrate has a thickness of less than 200 nm in some example cases, or less than 100 nm in still other example cases. Vias are fabricated to pass through the second substrate and into a dielectric layer between the first substrate and the second substrate. The vias electrically connect the memory arrays with conductive interconnections associated with the AES logic circuits, among other integrated circuits (e.g., peripheral circuits associated with the memory arrays on the second substrate). By having a second substrate that is less than 200 nm or less than 100 nm thick, the vias passing through the substrate can have a depth that is less than 200 nm or in some cases less than 100 nm. Vias having such a relatively short depth can result in favorable electrical characteristics (e.g., a low resistance of between 1 Ohm and 40 Ohms). This configuration can increase memory array density (e.g., number of memory cells per unit surface area of substrate) and prevent electromagnetic waves generated by operation of AES logic circuits from being detected. Note that reference herein to an "AES integrated circuit" or comparable expression is not intended to suggest that the only purpose of the integrated circuit is to execute an AES algorithm. In some cases, for instance, the integrated circuit may be configured to carry out other functions as well, unrelated to AES. To this end, reference herein to an "AES integrated circuit" is intended to include any integrated circuit that comprises AES circuitry, whether that AES circuitry is implemented in hardware, software, firmware, or some combination thereof.

General Overview

AES encryption can be performed by execution of a software algorithm as well as by the operation of AES algorithm functions that are executed by integrated circuits (such as a field programmable gate array, or FPGA) and their corresponding semiconductor devices. Whether the encryption is performed by a software algorithm or directly by integrated circuits or a combination of such software and hardware, the AES algorithm can be represented has having a few general functions. For example, a method flow diagram of an example AES method 100 is shown in FIG. 1A. An unexpanded encryption key is supplied to a key expander 108, which expands the encryption key. The expanded encryption key is then passed to an Add Round Key Module 116, the output of which is sequentially passed to the other modules and operated on as described in National Institute of Science and Technology (NIST) Federal Information Processing Standards Publication 197, published on Nov. 26, 2001.

It will be appreciated that when directly executed by integrated circuits, the functional blocks 104-136 shown in the method 100 can correspond to one or more dedicated (purpose-built) or programmable integrated circuits configured for the execution of the illustrated function, and which are placed in contact with one another for the performance of the method 100 as a whole.

Figure 1B:
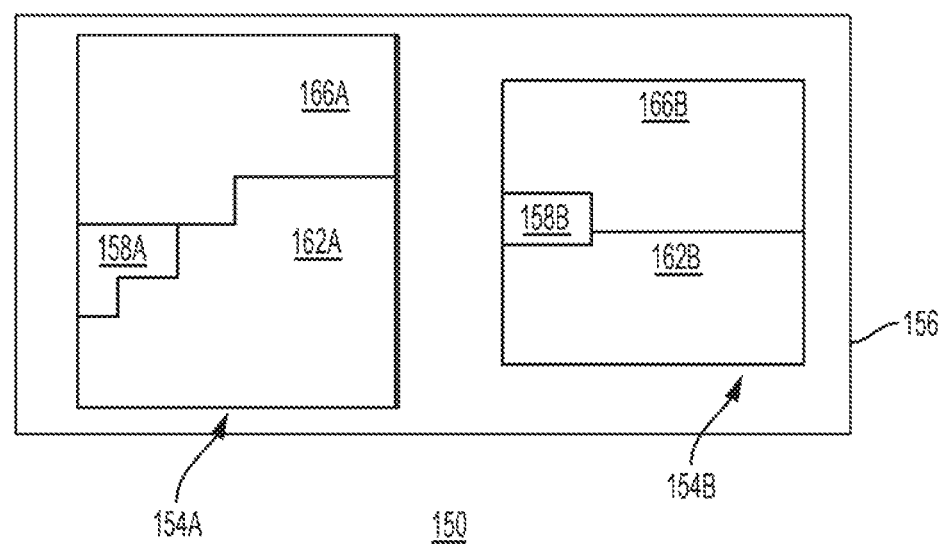
FIG. 1B is a schematic plan view of a semiconductor device with functional regions associated with memory arrays and AES algorithm execution.

From the depiction in FIG. 1A, it will be apparent that execution of the AES encryption method by integrated circuits and their corresponding semiconductor devices (e.g., transistors) may involve the use of both logic circuits and memory arrays, according to some embodiments. One example layout of an integrated circuit device 150 is schematically depicted in FIG. 1B. As is shown, two functional areas 154A, 154B (e.g., semiconductor die) are present on an electronic package substrate 156 (e.g., a multilayer laminate of FR4 board) of the device 150. Both of the functional areas 154A and 154B include areas for semiconductor devices 158A, 158B used for the operation of the device 150 as a whole (e.g., voltage and current regulators, addressing circuits), memory arrays 162A, 162 (e.g., DRAM, SRAM, other memory types, combinations thereof), and areas for AES integrated circuits 166A, 166B. As is apparent, a significant portion (sometimes as much as from 45% to 60%) of functional areas 154A, 154B is occupied by memory arrays 162A, 162B. Because so much surface area of an integrated circuit device 150 can be occupied by memory arrays 162A, 162B, the density of logic circuits on an AES encryption device substrate can be relatively low. This in turns can cause designs of devices, such as the device 150 to have an expanded surface area so that all of the areas 158, 162, 166 illustrated in FIG. 1B can be accommodated.

Furthermore, devices that include AES integrated circuits 166 on a surface of a substrate 156 (such as is illustrated for the device 150) can make the device susceptible to malicious activity. For example, electromagnetic waves can be emitted from AES integrated circuits that are actively encrypting or decrypting data. The amplitude and frequency of these electromagnetic waves will vary as various semiconductor devices and integrated circuits within the device 150 turn on and off. Techniques have been developed (e.g., using appropriately configured antennae and analytical algorithms) to detect these emitted electromagnetic waves from an integrated circuit device that has been removed from its electronic packaging. These malicious techniques can detect and analyze variations in the emitted electromagnetic waves while possible encryption keys are transmitted to the AES integrated circuits. Keys that match those stored in the device will produce a detectably different emitted electromagnetic signal than keys that are not correct. In this way, the emitted electromagnetic waves can be used to infer the encryption key used by the AES device 150. Once the encryption key is determined, data encrypted devices similar to the device maliciously analyzed can be decrypted by unauthorized and/or malicious parties.

Thus, techniques are described for fabricating a stacked-substrate AES integrated circuit device in which a second substrate is stacked on a first substrate. The first substrate includes AES integrated circuits used to perform various elements of the AES algorithm. The second substrate includes memory cells (whether SRAM, DRAM, other types of memory cells, or combinations thereof) as well as peripheral logic circuits used to read from, write to, and address data to memory cells. The arrays of memory cells and the peripheral circuits are referred to collectively as a "memory device" for brevity. Vias passing through the second substrate, into an interlayer dielectric between the first substrate and the second substrate can make contact with interconnections of the AES integrated circuits, thus placing the memory cells of the second substrate in electrical communication with the AES integrated circuits of the first substrate. This stacked-substrate configuration, in which AES logic circuits are disposed on the first substrate "below" the first substrate has at least two advantages. First, by placing AES integrated circuits on the first substrate in a stacked-substrate configuration, as described herein, a number of semiconductor devices (whether memory cells or logic circuits) per unit surface area ("density" for brevity) of the substrate is dramatically increased relative to more traditional device configuration in which logic circuits and embedded memory arrays are on a same substrate. Second, by covering the AES logic circuits on the first substrate with the second substrate, the amplitude of electromagnetic waves emitted by current fluctuations through the AES logic circuits is attenuated by the second substrate. This makes unauthorized decryption via external detection of electromagnetic waves emitted by the AES logic circuits more difficult, thus improving the overall security of encryption provided by embodiments described herein.

Architecture and Methodology

Figure 2:
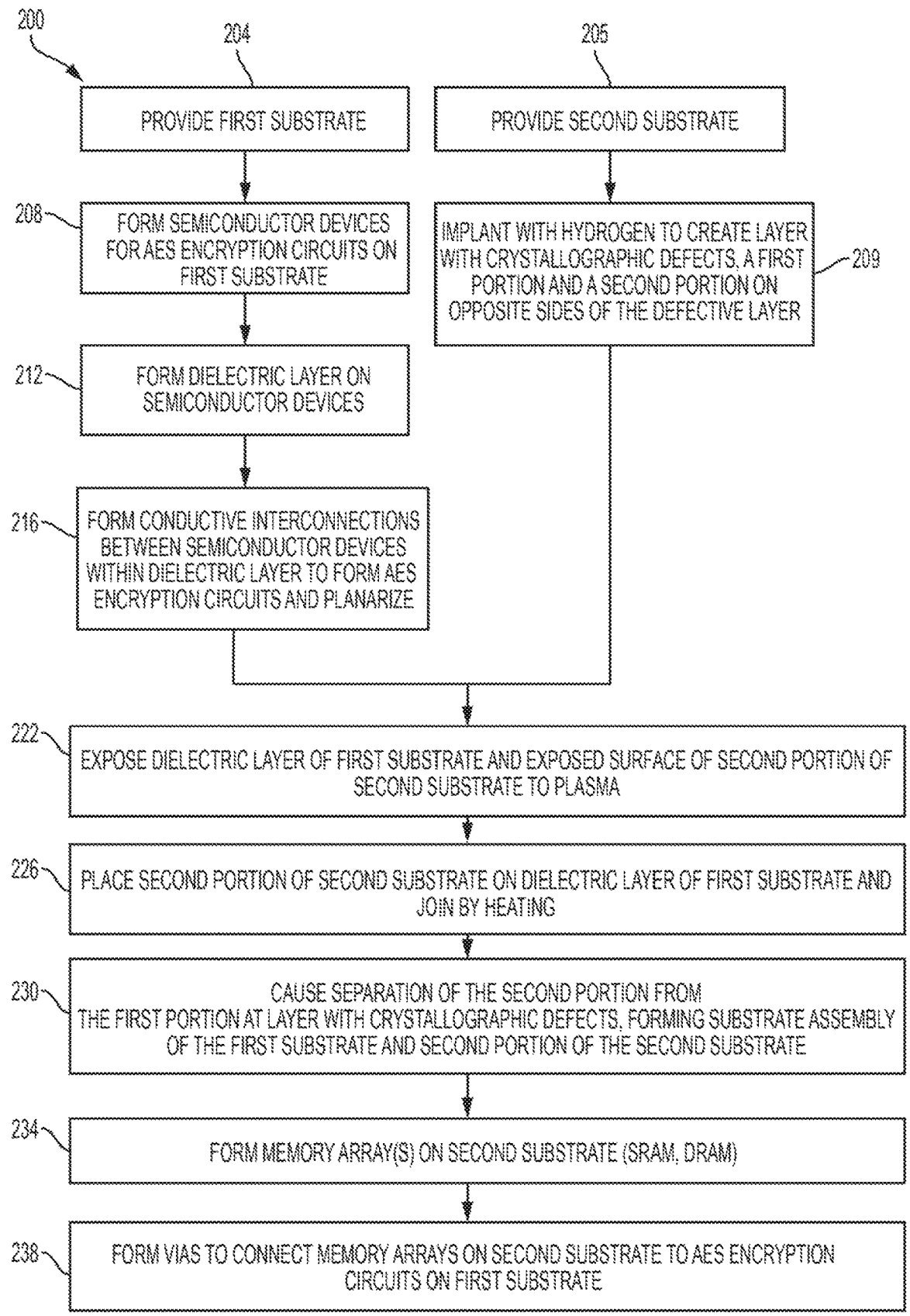
FIG. 2 is a method flow diagram of an example method for the fabrication of a stacked-substrate AES encryption device, in accordance with some embodiments of the present disclosure.

FIG. 2 illustrates an example method by which embodiments of the present disclosure can be fabricated. FIGS. 3A-3G illustrate cross-sectional views of various stages of fabrication of the example method depicted in FIG. 2. Concurrent reference to FIG. 2 and FIGS. 3A-3G will facilitate explanation.

Figure 3A:
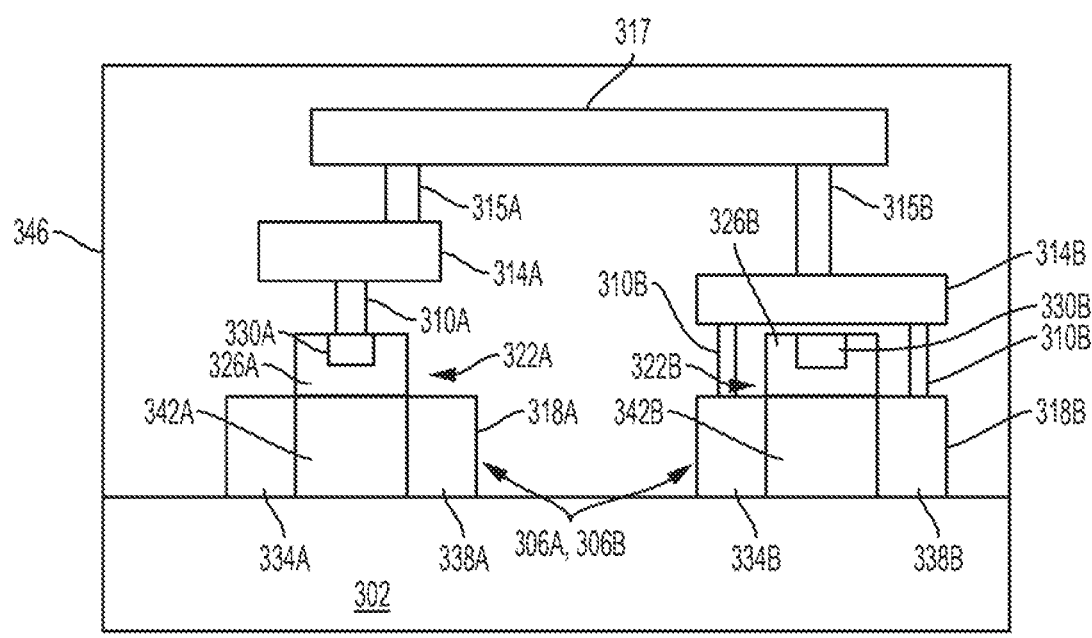
FIGS. 3A-3H illustrate example integrated circuit (IC) structures resulting from a method for forming a stacked-substrate AES encryption device, as illustrated in FIG. 2, in accordance with some embodiments of the present disclosure.
Figure 3B:

The method 200 includes providing 204 a first substrate 302 (as shown in FIG. 3A with various semiconductor devices and conductive interconnections, described in more detail below) and providing 205 a second substrate 304 (as shown in FIG. 3B). As will be described below in more detail, in some embodiments, AES integrated circuits (corresponding to the functions illustrated at a high level in FIG. 1A) can be fabricated on the first substrate 302. These AES integrated circuits can be used to encrypt and decrypt data according to the AES algorithm. In some embodiments, memory cells (and the memory arrays formed by groups of individual memory cells) and some corresponding peripheral circuits are fabricated on the second substrate 304 over the first substrate.

For both the first substrate 302 and the second substrate 304, any number of suitable substrate types and materials can be used. The substrate may be, for example, a bulk semiconductor wafer (e.g., bulk silicon, germanium, gallium arsenide or other III-V materials, etc.) or an on-insulator configuration (e.g., silicon on-insulator, germanium on-insulator, silicon germanium on-insulator, indium phosphide on-insulator, etc.). The substrate may be p-type, n-type, neutral-type, high or low resistivity, off-cut or not off-cut, etc. The substrate may have a vicinal surface that is prepared by off-cutting the substrate from an ingot, wherein substrate is off-cut at an angle between, for instance, 2° and 8° (e.g., 4° off-cut silicon). Note, however, the substrate need not have any such specific features, and that embodiments of the present disclosure can be implemented using any one of more of numerous different substrates. The thickness of the first substrate 302 can vary and in some embodiments, for example, is in the range of 100 nm to thousands of nanometers. In some cases, the substrate may be subsequently thinned or removed (e.g., by way of backside polish or other suitable thinning/removal process), after formation of the interconnect structure and application of protective layer such as etch stop, passivation layer, inter-layer dielectric (ILD), capping layer, etc. The thickness of the second substrate 304 as provided 205 can be of similar dimension to that of the first substrate 302. Techniques for thinning the second substrate 304 so as to maintain a height of a via through the second substrate to less than 100 nm or less than 200 nm are described below.

Once the first substrate 302 has been provided 204, semiconductor devices 306A, 306B (collectively 306, corresponding to AES integrated circuits) can be formed 208 on the first substrate 302. As indicated above, AES integrated circuits are those that can be configured to perform the various functions illustrated in FIG. 1A according to the NIST AES standard, in one example.

In some example embodiments, the semiconductor devices 306A, 306B can be formed 208 using standard metal oxide semiconductor (MOS) processing, although any desired process technology can be used. In some examples, such as the one shown in FIG. 3A, the semiconductor devices 306 of the peripheral circuits 306 can be formed 208 using fin-based semiconductor devices, including field effect transistors (also known as "FinFETs"). A FinFET is a MOSFET transistor built around a thin strip of semiconductor material (generally referred to as a fin) that extends from and above an underlying substrate (in this case, the substrate 302). The conductive channel of the FinFET device resides on the outer portions of the fin adjacent to the gate dielectric. Specifically, current runs along/within both sidewalls of the fin (sides perpendicular to the substrate surface) as well as along the top of the fin (side parallel to the substrate surface). Because the conductive channel of such configurations essentially resides along the three different outer, planar regions of the fin, such a FinFET design is sometimes referred to as a tri-gate transistor. Other types of FinFET configurations are also available, such as so-called double-gate FinFETs, in which the conductive channel principally resides only along the two sidewalls of the fin (and not along the top of the fin).

As shown in FIG. 3A, the fins 318 (318A, 318B in the example shown) of the semiconductor devices 306 include a salient feature composed of a semiconductor material that is configured to extend from and above a substrate surface. In some examples, a fin 318 of semiconductor material can be patterned (e.g., lithographically masked and then etched) from the first substrate 302 itself or from a layer of material formed on the substrate 302 that is compositionally different from the first substrate 302. Materials that are "compositionally different" or "compositionally distinct" as used herein refers to two materials that have different chemical compositions. This compositional difference may be, for instance, by virtue of an element that is in one material but not the other (e.g., SiGe is compositionally different than silicon), or by way of one material having all the same elements as a second material but at least one of those elements is intentionally provided at a different concentration in one material relative to the other material (e.g., SiGe having 70 atomic percent germanium is compositionally different than from SiGe having 25 atomic percent germanium). In addition to such chemical composition diversity, the materials may also have distinct dopants (e.g., gallium and magnesium) or the same dopants but at differing concentrations. In still other embodiments, compositionally distinct materials may further refer to two materials that have different crystallographic orientations. For instance, (110) silicon is compositionally distinct or different from (100) silicon. Creating a stack of different orientations could be accomplished, for instance, with blanket wafer layer transfer.

Regardless of the composition, a gate structure 322 (322A, 322B on corresponding fins 318A, 318B) comprising at least one layer of gate dielectric 326 (326A, 326B on corresponding fins 318A, 318B) and at least one layer of gate electrode 330 (330A, 330B on corresponding fins 318A, 318B) can be fabricated on the one or more the fins 318.

Examples of materials that can be used to form the gate dielectric layer 326 include, but are not limited to, dielectric materials used for interlayer dielectric (ILD) described below, as well as "high-k" materials, or both. High-k dielectric materials are those generally considered to have a dielectric constant greater than that of silicon dioxide and include, but are not limited to hafnium oxide, hafnium silicon oxide, lanthanum oxide, lanthanum aluminum oxide, zirconium oxide, zirconium silicon oxide, tantalum oxide, titanium oxide, barium strontium titanium oxide, strontium titanium oxide, yttrium oxide, aluminum oxide, lead scandium tantalum oxide, and lead zinc niobate. In some embodiments, additional processing may be performed on the high-k dielectric layer, such as an annealing process, to improve the quality of high-k material.

The portions of the fin 318 not covered by the gate structure 322 can be replaced with semiconductor material and/or doped to function as a source region 334 (334A, 334B on corresponding fins 318A, 318B) and a drain region 338 (338A, 338B on corresponding fins 318A, 318B). The portion of the fin 318 between the source region 334 and the drain region 338 and between the substrate 302 and the gate structure 322 is sometimes referred to as a semiconductor body and can be characterized as including a channel region 342 (342A, 342B on corresponding fins 318A, 318B) through which charge carriers can flow. A voltage can be applied to the gate structure to control the flow of charge carriers from the source region 334 to the drain region 338.

A layer of dielectric material 346 (sometimes referred to as interlayer dielectric) can be formed 212 on the semiconductor devices 306. The dielectric layer (ILD) may include any number of conventional dielectric materials commonly used in integrated circuit applications, such as oxides (e.g., silicon dioxide, carbon doped oxide), silicon nitride, or organic polymers (e.g., perfluorocyclobutane or polytetrafluoroethylene), fluorosilicate glass, and organosilicates (e.g., silsesquioxane, siloxane, or organosilicate glass). The dielectric material may be low-k or high-k depending on the desired isolation and may include pores or other voids to further reduce its dielectric constant. Examples of high-k materials have been described above. The dielectric layer thickness can vary and in some example embodiments is in the range of 50 nm to 5000 nm. In some embodiments, the dielectric layer may actually include multiple layers having the same or differing thicknesses. Likewise, in some embodiments, each ILD layer is implemented with the same dielectric material, but in other embodiments, at least some of the ILD layers are implemented with differing dielectric materials.

Techniques for forming 212 the layer of dielectric material 346 can be any of a wide range of suitable deposition techniques, including but not necessarily limited to: physical vapor deposition (PVD); chemical vapor deposition (CVD);

spin coating/spin-on deposition (SOD); and/or a combination of any of the aforementioned. Other suitable configurations, materials, deposition techniques, and/or thicknesses for base ILD layer 346 will depend on a given application and will be apparent in light of this disclosure. Numerous ILD configurations and dimensions will be apparent in light of this disclosure and the claimed invention is not intended to be limited to any particular configurations and dimensions. In some embodiments after forming, the ILD can be planarized and/or polished using any suitable technique including chemical-mechanical planarization/polishing (CMP) processes, for example.

As also shown in FIG. 3A, conductive interconnect structures (e.g., contact structures or "vias" 310A, 310B, 315A, 315B and conductive lines 314A, 314B, 317) can then be formed 216 within the dielectric layer 346. The electrical connection established by the conductive interconnect structures 310, 315, 314, 317 between semiconductor devices 306 thus forms the peripheral circuits (examples of which are described above) used to control the DRAM memory cells and arrays of memory cells. In some examples, the conductive interconnections can be formed of the same materials, and in other cases, may include compositionally different materials, whether different from layer to layer and/or within the same layer. For example, one or more of the vias 310, 315 and the conductive lines 314, 317 can include one or more layers of a conductive liner (e.g., silicon nitride, graphene, tantalum nitride) and one more layers of a conductive metal (e.g., copper, aluminum).

Formation 216 of these conductive interconnect structures can be performed by standard processes of photolithographic patterning and etching (e.g., removal of portions of the dielectric layer 346), followed by deposition of one or more layers in the patterned and etched regions of the dielectric layer 346. Example deposition techniques applicable to conductive material include but are not limited to sputtering, physical vapor deposition (PVD), chemical vapor deposition (CVD), metallo-organic CVD (MOCVD), among others. In some examples, metal lines and vias can be implemented as a dual damascene structure fabricated in the corresponding dielectric layer (ILD). Other embodiments may employ other interconnect structures (e.g., single damascene or other suitable metal interconnect pathway where interconnect metal can be provisioned). The dual damascene trench can be formed in the dielectric layer, for example, using standard lithography including via and trench patterning and subsequent etch processes followed by polishing, cleans, etc., as typically done. As with the preceding examples, the patterning and etch processes can be carried out, for instance, using wet and/or dry etch techniques.

The trenches in the ILD in which vias and conductive lines are formed can have various dimensions depending on the application. In one example case, an upper trench opening (i.e., corresponding to a conductive line portion of a dual damascene via/conductive line structure) is about 10 nm to 100 nm (e.g., 20 to 50 nm) and a lower via opening is about 5 nm to 50 nm (e.g., 10 to 25 nm), and the entire structure has an aspect ratio in the range of about 10:1 to 1.25:1 (e.g., 5:1). As will be appreciated, however, the dimensions and aspect ratio of the damascene trench will vary from one embodiment to the next, and the present disclosure is not intended to be limited to any particular range of dimensions, or any particular trench configuration.

In a more general sense, conductive interconnect cross-sections can include a profile having a first lateral width and a second lateral width that is smaller than the first lateral width, while in another example case the metal interconnect pathway cross-section demonstrates a profile having a substantially uniform lateral width from top to bottom.

In other examples, rather than forming trenches in ILD, the conductive interconnections can be formed by first forming a blanket layer of conductive material followed by patterning and etching of the blanket layer into the conductive interconnect structures illustrated in FIG. 3A. The conductive interconnect structures formed in this way can be electrically isolated from one another by subsequent deposition of dielectric material, as described above.

Note that the layout shown in FIG. 3A (and subsequent figures) is not intended to implicate any particular feature spacing or density. Rather, this layout is simply an arbitrary example, and any number of other layout designs can benefit from an embodiment of the present invention. In some examples, the layers of interconnection (e.g., vias and conductive lines) are demarcated from neighboring layers by an etch stop layer (e.g., a nitride layer) and may also include a barrier layer to prevent electromigration of material between adjacent conductive interconnect structures (e.g., nitride layers, among others).

As mentioned above, the method 200 also includes providing 205 a second semiconductor substrate 304, which in various embodiments can be any one of the substrate compositions or types previously described in the context of the first substrate 302. As indicated above, the final thickness of the second substrate as integrated into a stacked-substrate AES device is less than 200 nm or less than 100 nm so as to facilitate a similar depth (e.g., less than 200 nm or less than 100 nm) of a via connecting the memory arrays to the AES logic circuits.

Figure 3C:
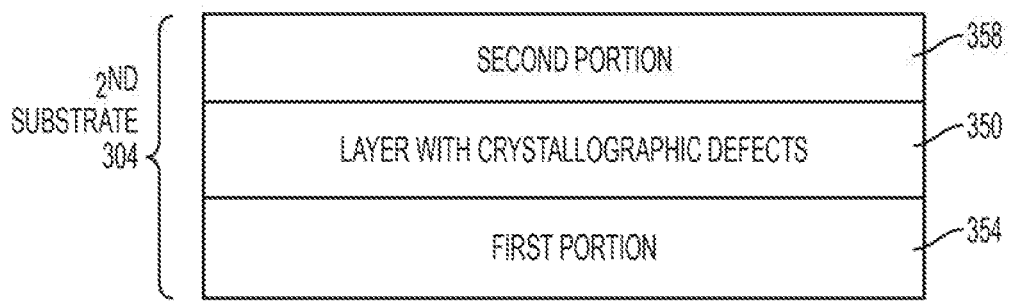

To accomplish this thinning, the second substrate 304 can be first implanted 209 with, for example, accelerated hydrogen ions through one of the exposed surfaces. In some examples, as shown in FIG. 3C, the accelerated hydrogen ions cause the formation of a sub-surface layer 350 with crystallographic defects that can be between from 5 nm to 500 nm below the surface through which the ions penetrate. More generally, the accelerated ions interact with atoms within the lattice of the second substrate 304 so as to displace some of the atoms from crystal lattice sites, thus forming vacancies within the crystalline lattice as one type of crystallographic defect. In some examples, dislocations and dislocation loops can form as another type of crystallographic defect. Regardless of the type or types of crystallographic defects that are formed by ion implantation, the defective layer 350 formed is a location at which the substrate 304 will cleave upon heat treatment.

In some examples, implantation can be accomplished by accelerating hydrogen ions (formed by exposure of hydrogen gas to an electrically biased filament so as to form a hydrogen plasma) at voltages of anywhere between 20 keV to 100 keV. Implantation densities of on the order of $10^{15}$ atoms/cm$^3$ to $10^{22}$ atoms/cm$^3$ can be used to form the defective layer 350. In some examples, the implantation current is from 5 mA/cm$^2$ of substrate to 10 mA/cm$^2$. In some examples, accelerated hydrogen ions within the previously indicated acceleration voltages and implantation densities are capable of producing on the order of from $10^{20}$ vacancies/cm$^3$ to $10^{23}$ vacancies/cm$^3$. In a specific example, an accelerating voltage of 40 keV can produce an approximately normal distribution of vacancies from 1 nm to 700 nm below the exposed surface through which the hydrogen ions are implanted, with a median of the distribution at about 500 nm below the surface (+/−50 nm).

In some examples, the defective layer 350 can have a thickness (measured perpendicular to the surface of the substrate 304 through which the accelerated ions pass) within any of the following ranges: from 5 nm to 50 nm; from 5 nm to 25 nm; from 5 nm to 10 nm; from 10 nm to 50 nm; from 25 nm to 50 nm. It will be appreciated that the accelerating voltage of the parting (hydrogen) ions can be selected so that a depth below the surface of the defective layer 350 is within a desired range according to standard techniques. For example, a greater accelerating voltage of the hydrogen ions will cause the hydrogen ions to impinge to a distance greater from the exposed surface than a lower accelerating voltage. In some embodiments, the accelerating voltage is selected to cause the defective layer 350 to be within the range below the surface indicated above (i.e., from 5 nm to 500 nm below the exposed surface).

In other examples, other accelerated particles, including but not limited to helium ions, can be used to create the defective layer 350.

As shown in FIG. 3C, for convenience of explanation, the defective layer 350 can be considered to divide the second substrate 304 into a first portion 354 and a second portion 358 on opposing sides of the defective layer 350. As can be appreciated in light of the present disclosure, a depth of the defective layer 350 essentially defines a thickness of the second portion 358.

Figure 3D:
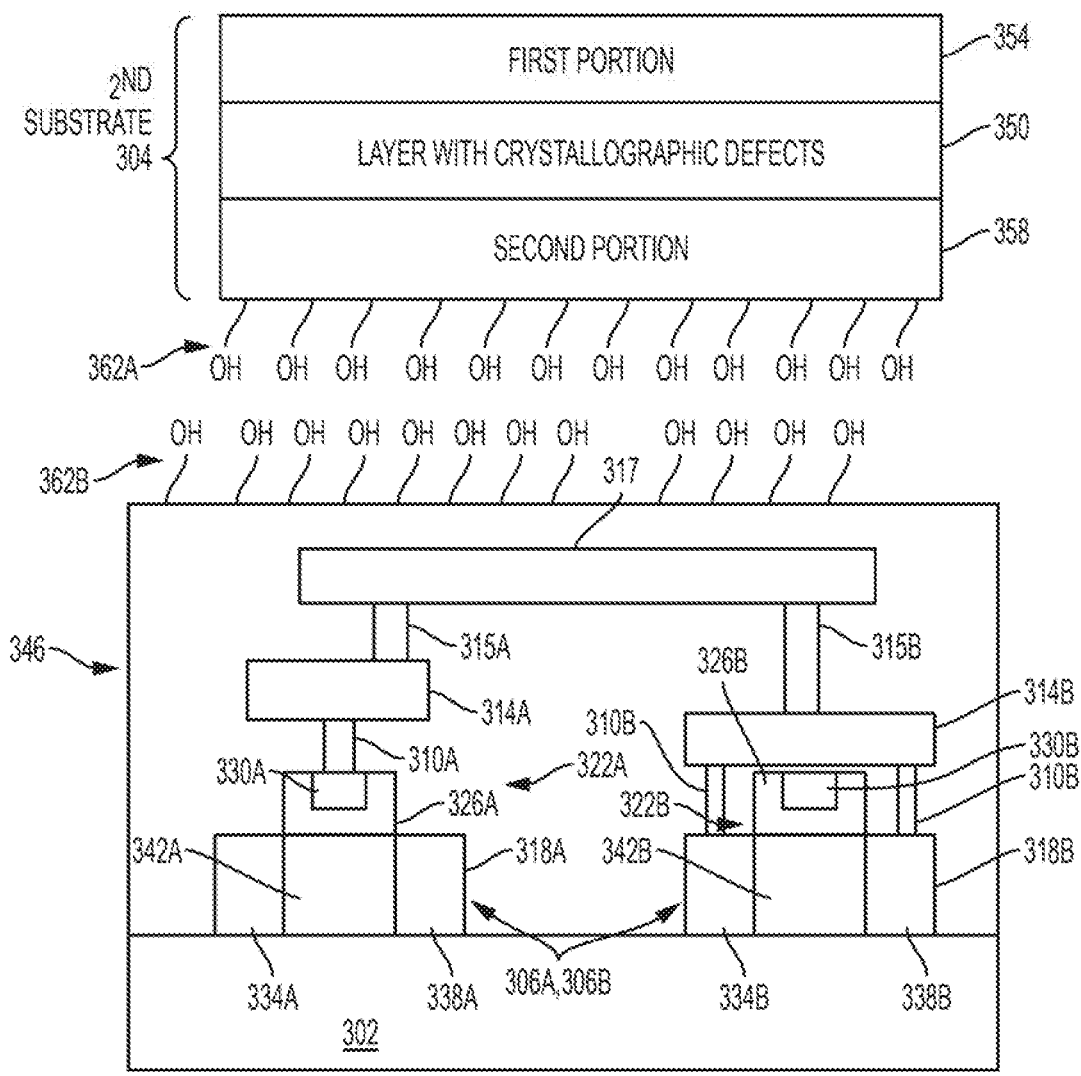

Surfaces of the first substrate 302 (e.g., the dielectric layer 346) and the second substrate 304 (in particular, the exposed surface of the second portion 358 of the second substrate 304) ultimately to be joined together are then exposed 222 to a plasma. In one example, exposure 222 is to an oxygen plasma. In other examples, exposure 222 can be to a UV enhanced ozone ($O_3$) plasma, an aqueous ($H_2O$) ozone solution plasma, or any other plasma chemistry capable of terminating the exposed surfaces in hydroxyl (OH) groups. As schematically shown in FIG. 3D, exposure 222 to the oxygen plasma creates layers 362A, 362B on the treated surfaces that include a plurality of hydroxyl groups.

The method 200 continues by placing 226 the plasma treated surface of the second portion 358 of the second substrate 304 in contact with the plasma treated surface of the first substrate 302, thus bringing the layers 362A, 362B into contact with one another. This initial contact between the plasma treated surfaces can be performed at ambient temperature (e.g., between 20° C. and 25° C.) and ambient atmospheric pressure (e.g., 1 atmosphere+/−5%).

Placing 226 the layers 362A, 362B into contact with one another and then heating the two substrates 302, 304 causes a condensation reaction to occur between hydrogen and hydroxyl groups that terminate the confronting surfaces. In some examples, the two substrates 302, 304 are heated 226 at temperatures anywhere between 300° C. and 400° C. (within normal equipment variation and measurement tolerances of approximately +/−2° C.) for between 10 minutes and 60 minutes in an inert atmosphere (e.g., $N_2$, Ar). As water is produced by the reaction and removed from the interface between the layers 362A, 362B by vaporization, a covalent bond is formed between the second portion 358 of the second substrate 304 and the ILD 346 of the first substrate 302, thus joining the two substrates together. In the case of a second substrate 304 fabricated from silicon, and a dielectric layer 346 fabricated from silicon dioxide, the covalent bonds formed are silicon-oxygen-silicon bonds. The silicon-oxygen-silicon bonds that bridge the interface are strong enough so that no additional adhesive or connection is needed to bond the first substrate 302 to the second substrate 304.

Figure 3E:
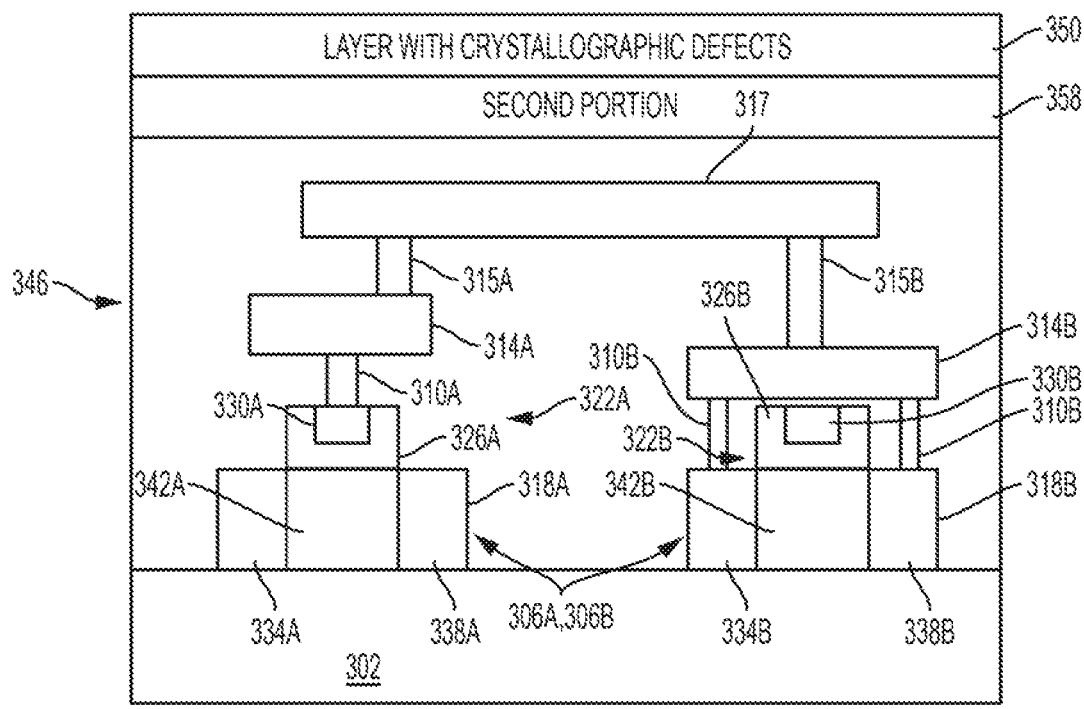
Figure 3F:
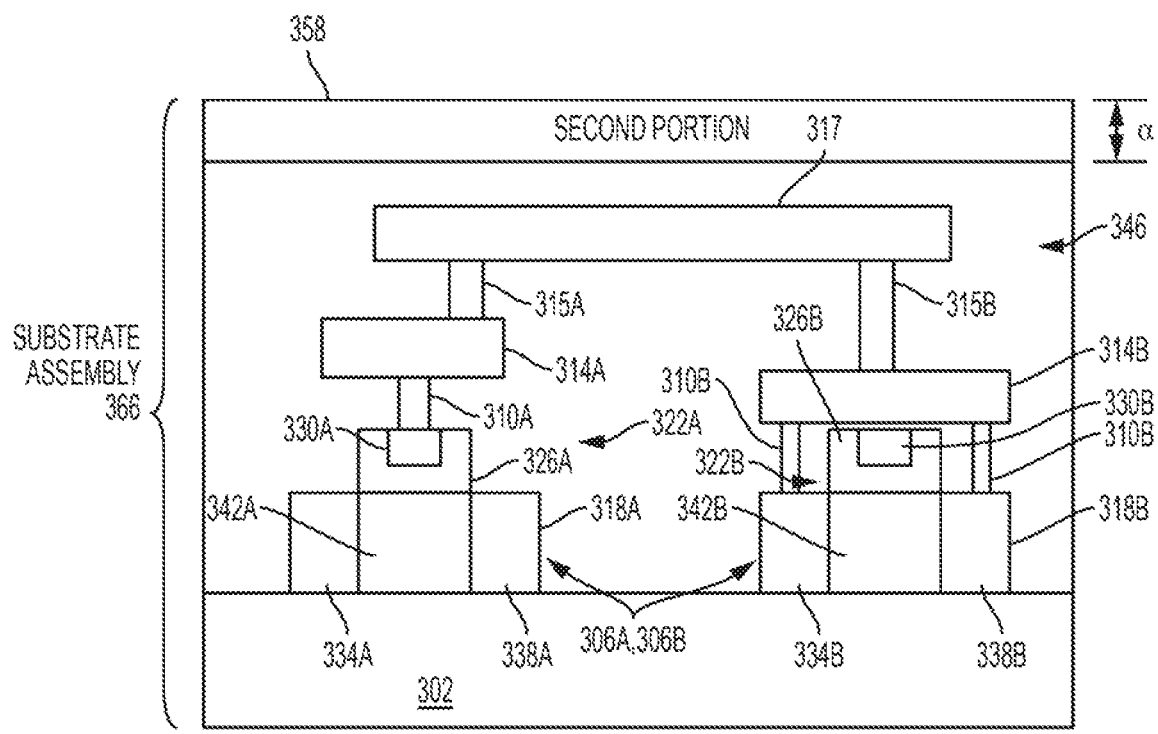

The heat 226 applied to the attached first substrate 302 and second substrate 304 also causes the separation 230 of the first portion 354 of the second substrate 304 from the layer with crystallographic defects 350. In some cases, this can be described as "exfoliation" of first portion 354 from the second substrate 304. As shown in FIG. 3E, in some cases some or all of the layer with crystallographic defects 350 remains on the second portion 358 after the heat induced separation 230 of the first portion 354. In some embodiments, any remaining layer 350 with crystallographic defects can be removed by standard polishing and planarization techniques, including but not limited to chemical mechanical polishing (CMP). In some examples, some of the material comprising the second portion 358 can be removed through continued chemical mechanical polishing so that a thickness (indicated in FIG. 3F as dimension α) can be within any of the following ranges: from 5 nm (nm) to 200 nm; from 5 nm to 100 nm; from 10 nm to 100 nm; from 10 nm to 50 nm; from 15 nm to 30 nm. The resulting structure, referred to herein as a substrate assembly 366, is shown in FIG. 3F.

In another embodiment, the fabrication of the second portion 358 can include the use of a silicon germanium (SiGe) layer. For example, a SiGe layer (of from 10 nm thick to 30 nm thick) on the second substrate can be composed and formed to have a coherent and epitaxial interface (i.e., a lattice parameter mismatch of less than 2%) with the underlying substrate (e.g., a silicon substrate). A silicon layer of from 10 nm to 20 nm thick corresponding to the second portion 358 can then be formed (epitaxially and coherently) on the SiGe layer. The defective layer 350 can then be formed via ion implantation (as described above) on a side of the SiGe layer opposite that of the silicon layer corresponding to the second portion 358. After separation of the second portion 358 from the substrate, the crystallographically defective layer can be removed via CMP until the SiGe layer is exposed. Silicon can be selectively removed from SiGe using CMP processes that include ammonium hydroxide ($NH_4OH$) or tetramethyl ammonium hydroxide ($N(CH3)_4OH$). In this way, the SiGe acts an "etch stop." In other words, the processes used to remove the silicon layer are composed so as to not remove the SiGe layer or remove it at a rate that is at least 5 times slower than silicon is removed. Once the SiGe layer is exposed and subsequently detected, the etch composition can be changed so that the SiGe layer can be removed using a selective etch that removes SiGe but does not remove Si (e.g., KOH,). Using a SiGe layer as an etch stop as described above can, in some examples, enhance control of a thickness α of the second portion 358. It will be appreciated that the second portion 358 essentially becomes a semiconductor substrate on which semiconductor devices can be fabricated, as is explained below.

Figure 3G:
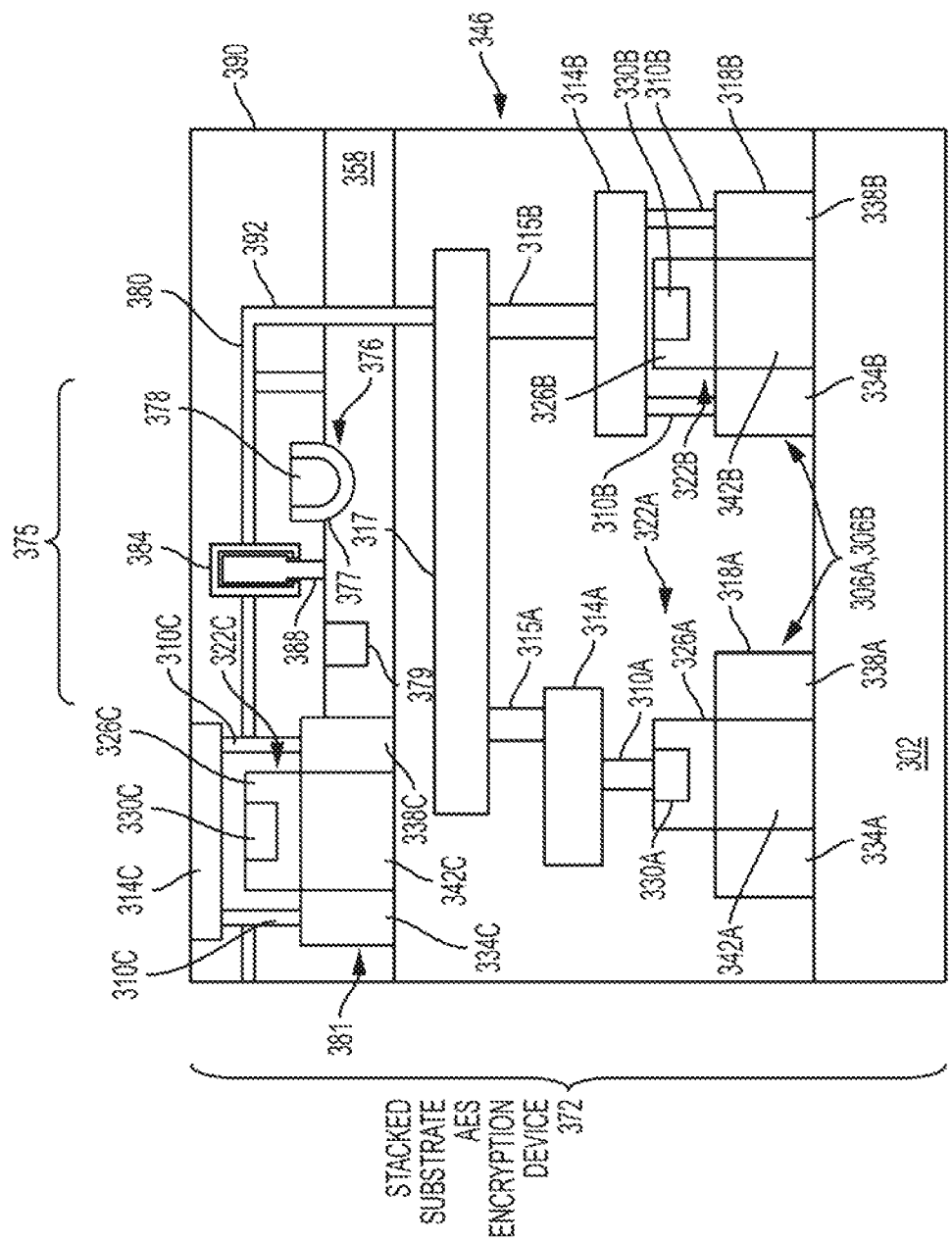

Having thus prepared the substrate assembly 366, memory arrays (including both memory cells and associated peripheral circuits) are formed 234 on the exposed surface of the second portion 358 on a side opposite that of the first substrate 302. This forms a stacked-substrate AES encryption device 372, an example of which is shown in FIG. 3G. Similar to the preceding cross-sections, the cross-section of FIG. 3G is taken perpendicular to word lines of the DRAM memory array.

The memory arrays, in this example represented for convenience as a DRAM memory cell 375 formed 234 on the second portion 358 of the second substrate 304. It will be appreciated that the DRAM cell 375 was selected for convenience and that other embodiments not illustrate can include any of a variety of memory device types, including but not limited to DRAM, SRAM, flash memory, combinations thereof, and other types of memory devices. The example AES encryption device 372 shown in FIG. 3G also includes a peripheral logic device 381 used for control of the DRAM cell 375. In examples, the peripheral logic device 381 can include a sense amplifier, a mux, an access transistor, among other types of devices. It will be appreciated that the specific type and configuration of the peripheral logic device 381 may change as a function of its associated memory cell. SRAMs and magnetic tunnel junction memory devices may generally employ different types and/or different configurations of peripheral logic devices 381.

The DRAM device 375 illustrated includes a word line 376, a bit line 380, a capacitor 384, interconnection 388, and inter-substrate via 392. In the example shown in FIG. 3G, the word line 376 controls (colloquially, "gates") access between the bit line 380 and the capacitor 384 that store a bit of data. The word line 376 is a conductive line often fabricated from silicon or some other conductive semiconductor material that can be biased to an on state and an off state, thus controlling access (e.g., reading from and writing to) the memory cell capacitor 384. In the example shown, the word line 376 includes a gate dielectric layer 377 and a gate electrode layer 378. Any of the materials described above in the context of FinFET gate dielectric and gate electrode layers are applicable to the corresponding word line 376 including, but not limited to, $SiO_2$ as the gate dielectric layer 377 and Si as the gate electrode layer 377. As also indicated above, the gate dielectric layer 377 and the gate electrode layer 378 can be fabricated from one or more layers. In examples in which more than one layer forms either or both of the gate dielectric layer 377 and the gate electrode layer 378, the layers can be compositionally similar or compositionally different.

As also shown in the example stacked-substrate DRAM memory device 372, the word line 376 has an arcuate transverse cross-sectional portion that is recessed into the second substrate 304. These "recessed channel access transistors" ("RCATs") can increase an effective channel length relative to devices that have a more rectangular cross-section. Longer effective channel length can reduce off state leakage current ("$I_{Off}$"), thus improving device performance.

In some examples, RCATs can be fabricated by using standard techniques to remove a portion of a substrate (or more generically a layer of semiconductor material that includes the substrate or is on the substrate, and that may or may not be doped in different examples) by, for example, lithographic patterning and etching. A gate dielectric layer 377 and gate electrode layer 378 (composed of any of the possible materials described above) can then be sequentially formed in the recess using standard techniques. In some examples, a cross-sectional profile perpendicular to the gate of the word line 376, such as that illustrated in FIG. 3G, may be curved or "arcuate." In other examples, a cross-sectional profile perpendicular to the gate of the word line 376 can be rectangular. It will be appreciated that due to natural process variation, a cross-sectional profile of any shape may have curved portions and linear portions and otherwise not conform exactly to a geometric shape.

While RCATs are shown in FIG. 3G, it will be appreciated that any type of word line 376 configuration can be used in embodiments of the present disclosure. Regardless of the type of word line 376 used, it will be appreciated that the word line 376 regulate access of the bit line 380 (and access transistors, not shown) to the capacitor 384.

Bit line 380 can, in some examples, be fabricated using a dual damascene process within an ILD layer 390, as explained above. For example, a trench having a first portion narrower than a second portion can be formed in dielectric layer 390 using standard lithographic patterning and etching techniques. Layer(s) of a liner (e.g., tantalum, tantalum nitride, tungsten nitride) can be formed followed by formation of conductive materials (e.g., tungsten, copper, aluminum) within the liner, thus forming via 388 and bit line 380. In other examples, a single damascene process can be used to separately form the trenches corresponding to the via 388 and bit line 380, both of which are subsequently filled with liner(s) and conductive material(s), respectively.

The capacitor 384 can be any type of capacitor compatible within a DRAM memory array, including the type shown in FIG. 3G, a capacitor over bit line (or "COB"). In some examples, the COB capacitor 384 illustrated in FIG. 3G is a metal-insulator-metal or "MIM" capacitor. It will be appreciated that the COB MIM capacitor 384 shown in FIG. 3G is selected only for convenience, and that other types of capacitors may be used in embodiments of the present disclosure.

In the COB type capacitor 384 shown, a dual damascene trench is formed in the dielectric layer 390. The narrower portion of the trench is filled with any required conductive liner(s) and then filled with a conductive material (e.g., copper, aluminum), thus forming corresponding ones of the via interconnection 388. The via interconnection 388 can then place the capacitor 384 in communication with the word line 376, the latter of which, as explained above, controls access between the bit line 380 and the capacitor 384. After formation of the via 388, a conductive metal layer is conformally formed in the second portion of the trench. This conductive metal layer, formed on walls of the trench formed by the etched portion of the dielectric layer 390, forms the outermost metal layer of the MIM capacitor 384. A layer of dielectric material (e.g., a high k material) is then conformally formed on the conductive metal layer, followed by filling the remaining portion of the trench with a conductive material. This series of layers then forms the metal-insulator-metal structure of the MIM capacitor.

An isolation barrier 379 (e.g., STI or an unbiased "dummy" word line) is disposed between word line 376 and any proximate devices (e.g., an adjacent word line or adjacent transistor).

The peripheral logic device 381 can, as described above, be used to control the memory cell 375. In this example, the peripheral logic device 381 is a finFET transistor having structures analogous to those described above: source region 334C, drain region 338C, semiconductor body (that includes a channel region) 342C, gate structure 322C (including gate dielectric 326C and gate electrode 330C), source and drain contact structures 310C, and interconnection 314C. These have been described above and need no further description. In other examples, a planar transistor may be used for the peripheral logic device 381.

It will be appreciated that in the example of an SRAM, various configurations and designs are possible and can be applied to the present disclosure. For example, bipolar junction transistors, MOSFET transistors, 2 transistor (2T) SRAM, six transistor (6T) SRAM, among others, and their associated peripheral/control circuits, may be formed on the second portion of the second substrate.

Having thus formed the various elements of a memory array on the second portion 358 of the second substrate and the AES integrated circuits on the first substrate 302, the memory arrays circuits and AES integrated circuits can be placed into contact (e.g., electrical communication) with one another. This can be accomplished by via 392 that extends from the bit line 380, through the dielectric layer 390, the second portion 358 of the second substrate, and the dielectric layer 346. In this example, the via 392 is connected to the conductive interconnection 317. It will be appreciated that in other examples, a via 392 can extend to different levels of conductive interconnect or even to a contact on a drain region of a semiconductor device (e.g., contact structure 310B on drain region 338B). The via 392 can be formed using standard techniques, such as lithographic patterning and etching. These have been described above in the context of interconnections 310, 314, 315, 317, among others, and need no further explanation.

The placement of the via 392 can be selected using standard optical alignment techniques used to align various levels of interconnections. In some examples in which the second portion 358 of the second substrate 304 is optically transparent (due to its thickness α of less than 200 nm, less than 100 nm, or in some cases even less than 50 nm), standard alignment techniques can be used to align the via 392 with corresponding structure (whether conductive interconnection of a peripheral circuit or semiconductor device) on the first substrate 302. In some examples, these standard alignment techniques involve the use of alignment structures and/or patterns that can be used as reference points by which lithographic masks and other process tools can be aligned. In other examples, some of the second portion 358 of the second substrate 304 can be removed (e.g., by lithographic patterning and etching) so that these alignment structures on the first substrate 302 (sometimes colloquially referred to as "fiducial structure" or "alignment marks") can be detected.

As described above, because the thickness α of the second portion is less than 200 nm (and in some cases less than 100 nm), the formation of the via 392 can use techniques similar or the same as those used to form interconnections 315A, 315B, 310A, 310B. That is, standard single damascene or dual damascene techniques for the fabrication of vias between metal levels in a "back end of line" (BEOL) of an integrated circuit can be adapted to the via 392 by selecting processes that can pattern dielectric material 390, second substrate second portion 358 (whether silicon or some other composition), and then dielectric material 346. As also indicated above, a depth of the via 392 can correspond to the thickness of the second portion 358 plus 5-10 nm above the surface (to contact to the bit line 380) and plus 5-10 nm below the second portion 358 (to contact peripheral circuit interconnections). In embodiments, a depth of the via 392 is less than 200 nm, less than 100 nm, less than 50 nm, or less than 20 nm. In embodiments, the depth of via 392 corresponding to (and in some cases 5 nm-20 nm greater than) the thickness α of the second portion 358 leads to a via 392 electrical resistance of from 1 Ohm to 40 Ohms or within any of the following sub-ranges: 1 Ohm to 5 Ohms; 1 Ohm to 10 Ohms; 10 Ohms to 30 Ohms; 15 Ohms to 35 Ohms.

Figure 3H:
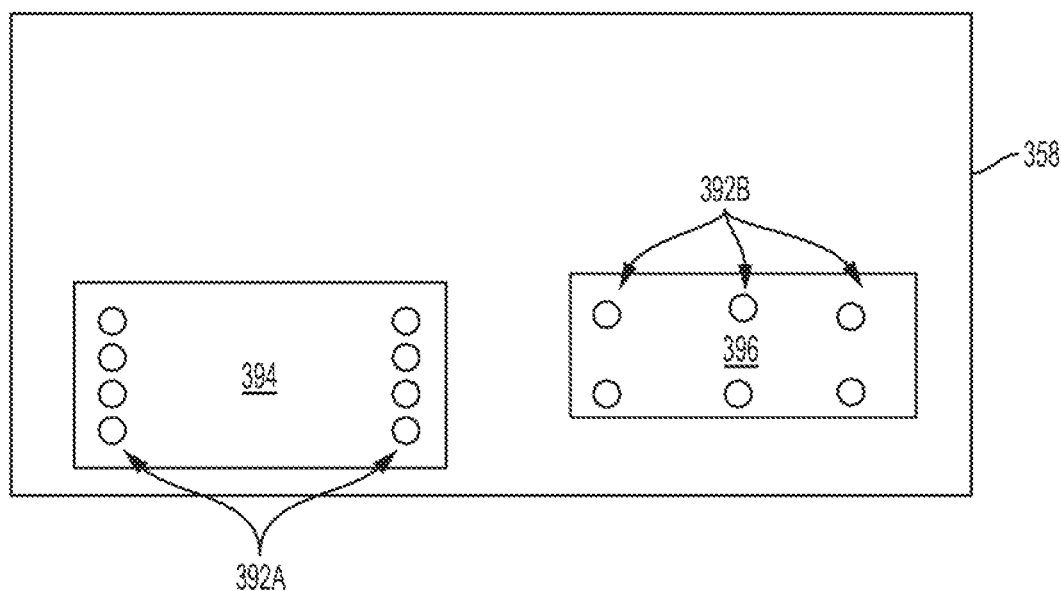

A schematic plan view of a stacked-substrate AES integrated circuit device 372 is illustrated in FIG. 3H. In this view, the AES integrated circuits are obscured by the exposed second substrate on which a DRAM array (represented in FIG. 3G as peripheral semiconductor device 381 and DRAM memory cell 375) is disposed. Upon comparison with the integrated circuit device 150 in FIG. 1B, it will be appreciated that much more of the substrate 358 is open (and optionally available for additional memory arrays or for a reduction in substrate size) relative the comparably sized substrate 156 shown in FIG. 1B.

As also shown in FIG. 3H, vias 392A and 392B are disposed in the two functional areas 394 (corresponding to a DRAM array 394) and 396 (corresponding to an SRAM array). It will be appreciated that the different configurations of the vias 392A, 392B are for illustration purposes, showing that vias will be located as a function of architectures of the circuits within the functional areas 394, 396 and the configuration of corresponding AES integrated circuits on the first substrate (not shown). It will further be appreciated that vias 392A, 392B can be placed in any convenient configuration for the communication between AES integrated circuits and corresponding memory devices. The vias 395A, 395B depicted in FIG. 3H are not drawn to scale but rather are exaggerated for convenience of illustration.

Example System

Figure 4:
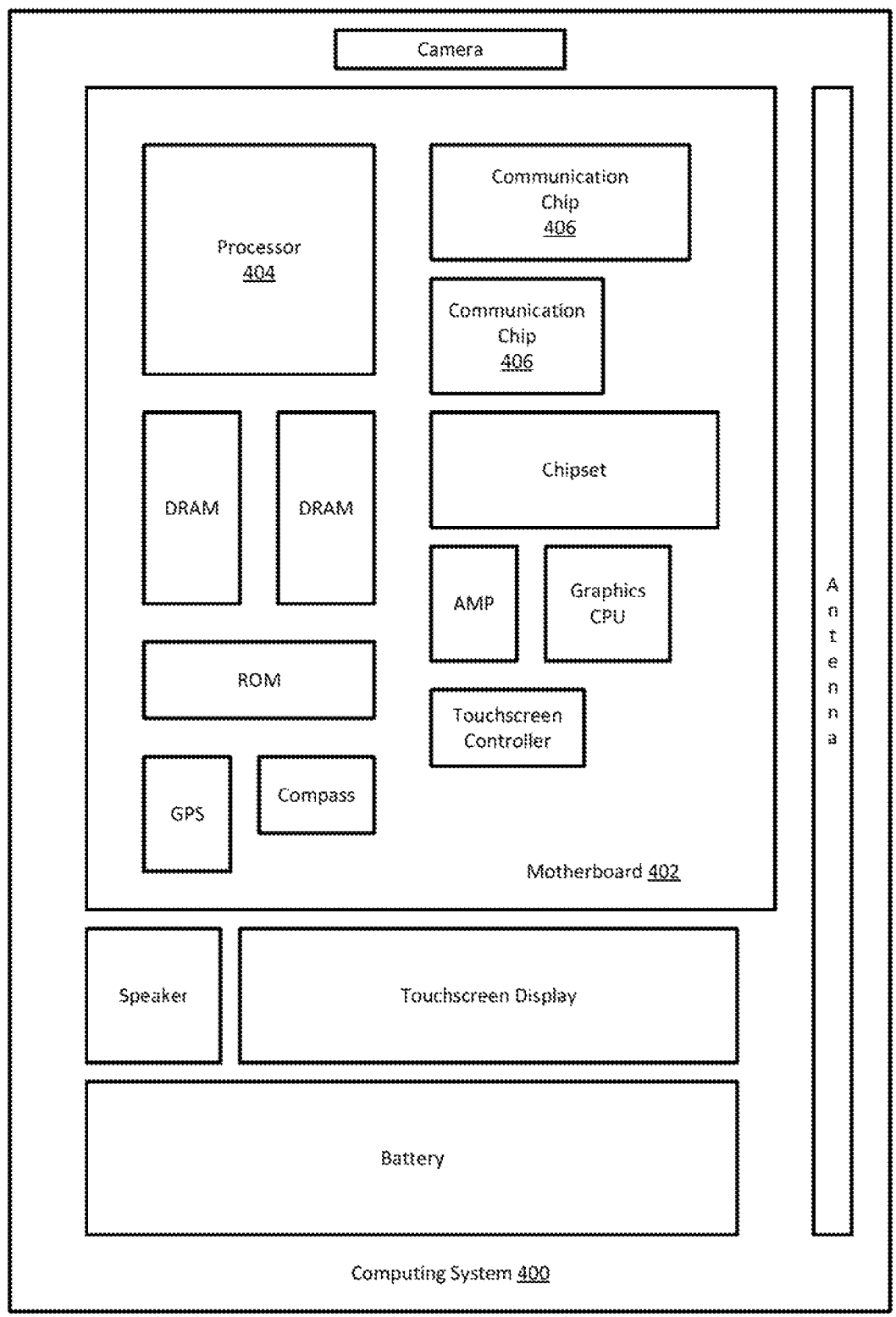
FIG. 4 illustrates a computing system implemented with integrated circuit structures and/or transistor devices formed using the techniques disclosed herein, in accordance with some embodiments of the present disclosure.

FIG. 4 is an example computing system implemented with one or more of the integrated circuit structures as disclosed herein, in accordance with some embodiments of the present disclosure. As can be seen, the computing system 400 houses a motherboard 402. The motherboard 402 may include a number of components, including, but not limited to, a processor 404 and at least one communication chip 406, each of which can be physically and electrically coupled to the motherboard 402, or otherwise integrated therein. As will be appreciated, the motherboard 402 may be, for example, any printed circuit board, whether a main board, a daughterboard mounted on a main board, or the only board of system 400, etc.

Depending on its applications, computing system 400 may include one or more other components that may or may not be physically and electrically coupled to the motherboard 402. These other components may include, but are not limited to, volatile memory (e.g., DRAM), non-volatile memory (e.g., ROM), a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth). Any of the components included in computing system 400 may include one or more integrated circuit structures or devices configured in accordance with an example embodiment (e.g., to include one or more stacked-substrate AES encryption devices, as variously provided herein). In some embodiments, multiple functions can be integrated into one or more chips (e.g., for instance, note that the communication chip 406 can be part of or otherwise integrated into the processor 404).

The communication chip 406 enables wireless communications for the transfer of data to and from the computing system 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including, but not limited to, Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing system 400 may include a plurality of communication chips 406. For instance, a first communication chip 406 may be dedicated to shorter range wireless communications such as Wi-Fi and Bluetooth and a second communication chip 406 may be dedicated to longer range wireless communications such as GPS, EDGE, GPRS, CDMA, WiMAX, LTE, Ev-DO, and others. In some embodiments, communication chip 406 may include one or more transistor structures having a gate stack with an access region polarization layer as variously described herein.

The processor 404 of the computing system 400 includes an integrated circuit die packaged within the processor 404. In some embodiments, the integrated circuit die of the processor includes onboard circuitry that is implemented with one or more integrated circuit structures or devices as variously described herein. The term "processor" may refer to any device or portion of a device that processes, for instance, electronic data from registers and/or memory to transform that electronic data into other electronic data that may be stored in registers and/or memory.

The communication chip 406 also may include an integrated circuit die packaged within the communication chip 406. In accordance with some such example embodiments, the integrated circuit die of the communication chip includes one or more integrated circuit structures or devices as variously described herein. As will be appreciated in light of this disclosure, note that multi-standard wireless capability may be integrated directly into the processor 404 (e.g., where functionality of any chips 406 is integrated into processor 404, rather than having separate communication chips). Further note that processor 404 may be a chip set having such wireless capability. In short, any number of processor 404 and/or communication chips 406 can be used. Likewise, any one chip or chip set can have multiple functions integrated therein.

In various implementations, the computing system 400 may be a laptop, a netbook, a notebook, a smartphone, a tablet, a personal digital assistant (PDA), an ultra-mobile PC, a mobile phone, a desktop computer, a server, a printer, a scanner, a monitor, a set-top box, an entertainment control unit, a digital camera, a portable music player, a digital video recorder, or any other electronic device that processes data or employs one or more integrated circuit structures or devices formed using the disclosed techniques, as variously described herein.

Further Example Embodiments

The following examples pertain to further embodiments, from which numerous permutations and configurations will be apparent.

Example 1 is a first semiconductor substrate; a second semiconductor substrate that is less than 200 nm thick; an integrated circuit between the first semiconductor substrate and the second semiconductor substrate, the integrated circuit comprising advanced encryption standard (AES) circuitry; a layer of dielectric material between the first semiconductor substrate and the second semiconductor substrate and over the integrated circuit; a memory array over the second semiconductor substrate; and a via passing through the second semiconductor substrate and the dielectric layer, the via connecting the memory array to the integrated circuit.

Example 2 includes the subject matter of Example 1, wherein the memory array comprises one or more of a DRAM array and an SRAM array.

Example 3 includes the subject matter of Example 2, wherein the DRAM array comprises: at least one capacitor; and at least one bit line, wherein the via connects the at least one bit line to the AES circuitry of the integrated circuit.

Example 4 includes the subject matter of Example 2, wherein the SRAM array comprises at least two transistors, wherein the via connects the at least two transistors to the AES circuitry of the integrated circuit.

Example 5 includes the subject matter of any of the preceding Examples, wherein the integrated circuit comprises a first integrated circuit, a second integrated circuit, and a conductive line connecting the first integrated circuit and the second integrated circuit, and further wherein the via connects the memory array to the conductive line.

Example 6 includes the subject matter of any of the preceding Examples, wherein the memory array further comprises a peripheral circuit associated with at least one memory cell.

Example 7 includes the subject matter of any of the preceding Examples, wherein the integrated circuit comprises a fin, the fin further comprising a semiconductor body between a source region and a drain region.

Example 8 includes the subject matter of any of the preceding Examples, wherein the second semiconductor substrate is from 15 nm to 50 nm thick.

Example 9 includes the subject matter of any of the preceding Examples, wherein the second semiconductor substrate is from 15 nm to 50 nm thick.

Example 10 includes the subject matter of any of Examples 1-9, wherein the second semiconductor substrate is from 10 nm to 20 nm thick.

Example 11 includes the subject matter of Example 10, wherein the via has a depth of from 10 nm to 20 nm.

Example 12 includes the subject matter of any of the preceding Examples, wherein the second semiconductor substrate is optically transparent.

Example 13 includes the subject matter of any of the preceding Examples, further comprising: an additional dielectric layer on the memory array; a third semiconductor substrate on the additional dielectric layer; an additional memory array on the third semiconductor substrate; and at least one additional via connecting the memory array on the third semiconductor substrate to the AES circuitry of the integrated circuit of the first semiconductor substrate.

Example 14 includes the subject matter of any of the preceding Examples, wherein the via has an electrical resistance of from 1 Ohm to 40 Ohms.

Example 15 includes a method for forming an integrated circuit device, the method comprising: providing a first substrate and a second substrate; forming integrated circuits configured for advanced encryption standard (AES) operations over the first substrate, the integrated circuits comprising at least one semiconductor device and at least one interconnect structure; forming a layer of dielectric material over the integrated circuits; exposing the layer of dielectric material of the first substrate and an exposed surface of the second substrate to a plasma; after exposure to the plasma, placing the exposed surface of the second substrate in contact with the layer of dielectric material of the first substrate; heating the second substrate and the first substrate while maintaining contact therebetween; forming an array of memory cells on the second substrate; and forming a via through the second substrate, through the layer of the dielectric material, thereby connecting the via and the integrated circuits.

Example 16 includes the subject matter of Example 15, further comprising: implanting the second substrate with hydrogen ions, the implanting creating a sub-surface layer of crystallographic defects that divides the second substrate into a first portion and a second portion, the second portion in contact with the layer of dielectric material of the first substrate; and removing the first portion of the second substrate from the sub-surface layer of crystallographic defects, wherein the array of memory cells is formed on the second portion of the second substrate.

Example 17 includes the subject matter of either of Examples 15 or 16, further comprising aligning the array of memory cells and the via with the integrated circuits using alignment marks on the first substrate that are optically detectable through the second substrate.

Example 18 includes the subject matter of any of Examples 15-17, further comprising: providing data to the integrated circuits over the first substrate connected to the array of memory cells of the second substrate by the via; performing, using the integrated circuits, an advanced encryption standard (AES) algorithm on the data, the performing producing electromagnetic waves that are emitted from the integrated circuits; and blocking emission of the electromagnetic waves with the second substrate.

Example 19 includes the subject matter of any of Examples 15-18, wherein the plasma is an oxygen plasma, the oxygen plasma creating a plurality of hydroxyl groups on the exposed layer of dielectric material and the exposed surface of the second substrate.

Example 20 includes the subject matter of Example 19, wherein heating the second substrate on the first substrate causes a condensation reaction between opposing hydroxyl groups on the layer of dielectric material and the exposed surface of the second substrate, the condensation reaction causing covalent bonds to form between the second substrate and the first substrate.

What is claimed is:

1. An integrated circuit device comprising:
   a first semiconductor substrate;
   a second semiconductor substrate that is less than 200 nm thick;
   an integrated circuit between the first semiconductor substrate and the second semiconductor substrate, the integrated circuit comprising advanced encryption standard (AES) circuitry;
   a layer of dielectric material between the first semiconductor substrate and the second semiconductor substrate and over the integrated circuit;
   a memory array over and on the second semiconductor substrate; and
   a via extending entirely through a portion of the second semiconductor substrate and extending into the dielectric layer, the via connecting the memory array to the integrated circuit.

2. The integrated circuit device of claim 1, wherein the memory array comprises one or more of a DRAM array and an SRAM array.

3. The integrated circuit device of claim 2, wherein the DRAM array comprises: at least one capacitor; and at least one bit line, wherein the via connects the at least one bit line to the AES circuitry of the integrated circuit.

4. The integrated circuit device of claim 2, wherein the SRAM array comprises at least two transistors, wherein the via connects the at least two transistors to the AES circuitry of the integrated circuit.

5. The integrated circuit device of claim 1, wherein the integrated circuit comprises a first integrated circuit, a second integrated circuit, and a conductive line connecting the first integrated circuit and the second integrated circuit, and further wherein the via connects the memory array to the conductive line.

6. The integrated circuit device of claim 1, wherein the memory array further comprises a peripheral circuit associated with at least one memory cell.

7. The integrated circuit device of claim 1, wherein the integrated circuit comprises a fin, the fin further comprising a semiconductor body between a source region and a drain region.

8. The integrated circuit device of claim 1, wherein the second semiconductor substrate is from 15 nm to 50 nm thick.

9. The integrated circuit device of claim 8, wherein the second semiconductor substrate is from 15 nm to 50 nm thick.

10. The integrated circuit device of claim 1, wherein the second semiconductor substrate is from 10 nm to 20 nm thick.

11. The integrated circuit device of claim 10, wherein the via has a depth of from 10 nm to 20 nm.

12. The integrated circuit device of claim 1, wherein the second semiconductor substrate is optically transparent.

13. The integrated circuit device of claim 1, further comprising:
    an additional dielectric layer on the memory array;
    a third semiconductor substrate on the additional dielectric layer;
    an additional memory array on the third semiconductor substrate; and
    at least one additional via connecting the memory array on the third semiconductor substrate to the AES circuitry of the integrated circuit of the first semiconductor substrate.

14. The integrated circuit device of claim 1, wherein the via has an electrical resistance of from 1 Ohm to 40 Ohms.

* * * * *